Patented June 30, 1925.

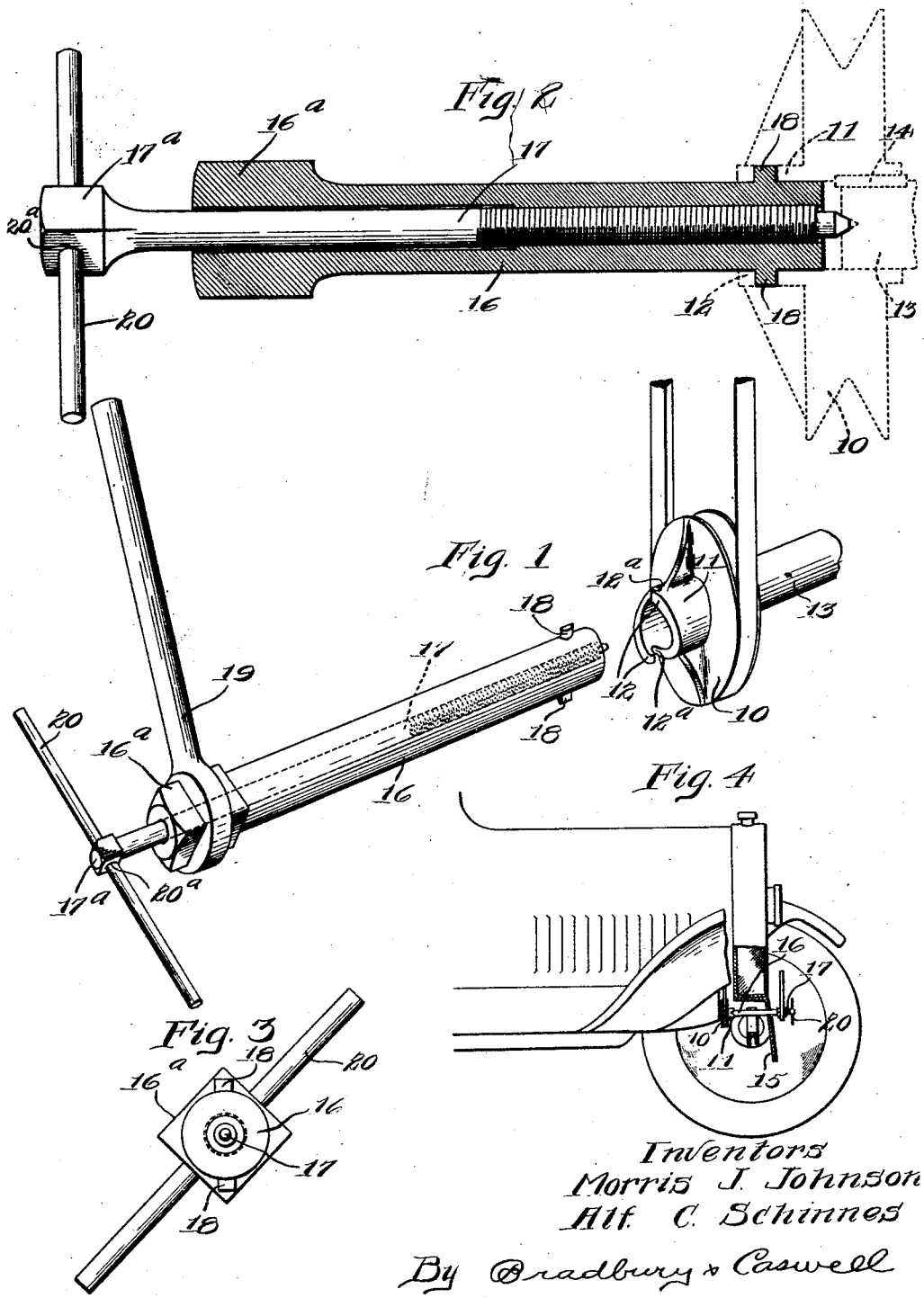

1,544,235

UNITED STATES PATENT OFFICE.

MORRIS J. JOHNSON AND ALF C. SCHINNES, OF MINNEAPOLIS, MINNESOTA.

PULLER FOR FAN-DRIVE PULLEYS.

Application filed July 21, 1924. Serial No. 727,128.

*To all whom it may concern:*

Be it known that we, MORRIS J. JOHNSON and ALF C. SCHINNES, citizens of the United States, residing in the city of Minneapolis, county of Hennepin, and State of Minnesota, have invented new and useful Improvements in Pullers for Fan-Drive Pulleys, of which the following is a specification.

Our invention relates to an improvement for pulling the ordinary fan drive pulley conventionally combined with a crank engaging clutch member from the crank shaft of an automobile engine. This type of pulley is usually arranged to turn in narrow confines at the rear of the radiator of an automobile and in such position is in accessible to any of the ordinary tools for dislodgment thereby from its driven, key fitted position on the engine crank shaft.

An object of the invention is to provide a simple, durable and inexpensive tool adapted to be applied to a fan drive pulley of the character above described in the manner of the application thereto of an ordinary starting crank, said tool being easily and conveniently operated to pull said pulley from the engine crank shaft upon which it is mounted.

With the foregoing and other objects in view, which will appear in the following description, the invention resides in the novel combination and arrangement of parts and in the details of construction hereinafter described and claimed.

In the drawings, Fig. 1 is a view in perspective, the same illustrating a tool embodying our invention and a fan drive pulley of the type to which said tool is applicable; Fig. 2 is a view illustrating the body of the tool, in section, and the screw therein, in elevation, the body and screw being further illustrated in operative relation with respect to a pulley and shaft, both shown in dotted lines; Fig. 3 is an end view of the tool and Fig. 4 is a view illustrating the method of application of the tool to a fan drive pulley in operative position on the crank shaft of an automobile engine.

Referring to the drawings, it will be observed that we have used similar reference characters throughout the several views to indicate similar parts. The combined pulley and clutch to which the improvement is applicable, comprises a pulley 10 and a hub 11 thereon, said hub being formed with opposed ratchet-like claws 12, the tips of said claws overreaching recesses 12ª cut in the stock of the hub 11. The pulley 10 has an axial bore therein, key seated in the usual manner, and, in accordance with the usual practice, is pressed onto the end of an engine crank shaft 13, the fit thus afforded between pulley and shaft being supplemented with the use of a key 14 in the key seat of the pulley 10 and in a companion key seat in the crank shaft 13. The bore at the forward end of the hub 11 is left open to receive the pin equipped tip of the ordinary starting crank, inserted, as usual, through the front guard 15 of an automobile (Fig. 4).

In our tool, which includes an elongated tubular body 16 and a screw 17 threaded axially therein, it will be noted that said body resembles, in form, the shank of an ordinary starting crank. Thus shaped said body 16 is capable of being applied to the hub 11 on the pulley 10 in the manner of a starting crank. Opposed lugs 18 near the tip of the body 16 correspond with the end of the pin at the tip of the ordinary starting crank, said lugs 18 being adapted to coact with the claws 12 on the hub 11.

Referring to Fig. 1, it will be seen that by inserting the tip of the body 16 into the hub 11 and twisting said body in a clockwise direction, the lugs 18 will be swung into the recesses 12ª overreached by the tips of the claws 12. Thus firmly held by continuing such twisting force, the lugs 18 are interlockingly engaged with the claws 12, the result being that the body 16 is secured against withdrawal from the pulley 10. The screw 17 is fitted to the body 16 with a right hand thread and, when turned in a clockwise direction in said body, advances therein, the tip of said screw engaging the end of the shaft 13. Continuing such rotation of said screw 17, the abutment of the tip thereof against the shaft 13 causes the pulley 10 to be pulled from the shaft through the medium of the body 16. While the clockwise turning of the screw 17 operates through friction between said screw and body to twist the latter and thus secure the lugs 18 interlocked with the claws 12 on the hub, it may be found that an additional torque-like force must be expended upon the body 16 to keep the lugs 18 from backing out of the grip of said claws 12. To arrange for the application of such additional force to the body 16, we enlarge said body at the head thereof and shoulder the same as at 16ª, whereby a wrench 19 particularly adapted for the purpose, or an ordinary wrench may be applied to the head of the body 16. The screw 17 is also shouldered at the head 17ª thereof to receive a wrench for turning the same, another means for turning said screw residing in the removable handle-pin 20, which has a driving fit in a tapered bore 20ª in said head.

In the employment of our tool, it is obvious that no preliminary dismantling of the automobile is required preparatory to the removal of a pulley 10 from the engine crank shaft. The body 16 is applied to the pulley in a quick movement as one would apply a starting crank thereto. With the automobile in gear and the brakes set to lock the crank-shaft 13, force is exerted upon the wrench 19 in a clockwise direction and the handle-pin 20 turned in the same direction. Bearing against the shaft 13, the screw 17 on continued rotation operates through the body 16, which is then secured to the pulley 10, to pull said pulley from its tightly fitted position on the engine crank-shaft. Having performed its work, the tool is readily detached from the grip of the claws 12, merely through a partial counter-clockwise turn of the body 16 with respect to the pulley 10.

Changes in the specific form of our invention, as herein disclosed, may be made within the scope of what is claimed without departing from the spirit of our invention.

Having described our invention, what we claim as new and desire to protect by Letters Patent is:

1. In a device for pulling from a shaft a wheel conventionally combined with a crank receiving hub having ratchet-like clutch claws formed therein, a tubular body, the head thereof being adapted to receive a tool for twisting said body, lugs near the tip of the body, said body being adapted to be inserted at its tip in said hub and said lugs adapted to co-act with and interlockingly engage said claws under torque of the body, and a screw threaded within said body and adapted to be brought to bear at the tip thereof against the end of said shaft upon rotation thereof with respect to the body, the head of said screw being adapted to receive a tool for turning the same.

2. In a device for pulling from a shaft a combined pulley and cranking clutch member of conventional type, a body in the form of the shank of an ordinary crank, opposed lugs near the tip of the body in simulation of the usual clutch engaging pin of a crank, a screw threaded axially in said body, means for twisting said body in a direction to interlockingly engage said lugs with said clutch member and means for turning the screw within the body to bring the tip thereof to bear against the end of said shaft.

3. In a device for pulling from a shaft an element including claws radially related with respect to the axis of the shaft, a body, a screw threaded axially in the body, and radial lugs on said body, the lugs being adapted to co-act with and be gripped by said claws upon the application of twisting force to the body, the screw being adapted to be turned in the body to bring the tip thereof against the end of the shaft.

4. In a device for pulling from a shaft an element including a claw thereon, a body, a screw threaded in the body and adapted to be turned in one direction with respect thereto to bring the tip of said screw to bear against the end of said shaft, and a member on the body for co-action with said claw, said member being adapted to be held in interlocking engagement with the claw under the application of twisting force to said body in the said direction of rotation of said screw.

5. In a device for pulling from a shaft an element including a claw thereon, a body, a screw threaded in the body and adapted to bear at the end thereof against the end of said shaft, and a member on the body designed to co-act with said claw, said member being adapted to be held in interlocking engagement with the claw through torque on said body.

In testimony whereof, we have signed our names to this specification.

MORRIS J. JOHNSON.
ALF C. SCHINNES.